United States Patent [19]
Carnevale et al.

[11] Patent Number: 5,471,626
[45] Date of Patent: Nov. 28, 1995

[54] VARIABLE STAGE ENTRY/EXIT INSTRUCTION PIPELINE

[75] Inventors: Michael J. Carnevale, Rochester; Ronald N. Kalla, Zumbro Falls; Gary P. McClannahan; Michael R. Trombley, both of Rochester, all of Minn.

[73] Assignee: International Business Machines Corporation, Armonk, N.Y.

[21] Appl. No.: 879,651

[22] Filed: May 6, 1992

[51] Int. Cl.$^6$ .................................................. G06F 9/38
[52] U.S. Cl. .................................... 395/775; 395/375
[58] Field of Search ................................. 395/375, 775, 395/800

[56] References Cited

U.S. PATENT DOCUMENTS

| | | | |
|---|---|---|---|
| 4,228,497 | 10/1980 | Gupta et al. | 395/775 |
| 4,450,525 | 5/1984 | Demuth et al. | 395/375 |
| 4,574,344 | 3/1986 | Harris et al. | 395/500 |
| 4,722,049 | 1/1988 | Lahti | 395/375 |
| 4,777,594 | 10/1988 | Jones et al. | 395/375 |
| 4,855,947 | 8/1989 | Zymslowski et al. | 395/375 |
| 4,890,221 | 12/1989 | Gage | 395/775 |
| 4,893,233 | 1/1990 | Denman et al. | 395/375 |
| 5,099,421 | 3/1992 | Buerkle et al. | 395/375 |

OTHER PUBLICATIONS

IBM Technical Disclosure Bulletin, vol. 34, No. 7A, Dec. 1991, pp. 472–480, "Data Processing System".
"Instruction Reorganization for a Variable–Length Pipelined Microprocessor", S. Abraham and K. Padmanabhan, International Conference on Computer Design, Oct. 3, 1988, New York, pp. 96–101.

*Primary Examiner*—Jack B. Harvey
*Assistant Examiner*—Glenn A. Auve
*Attorney, Agent, or Firm*—J. Michael Anglin; Frederick W. Niebuhr; Owen J. Gamon

[57] ABSTRACT

An instruction pipeline includes a sequence of interconnected pipeline stages, each stage dedicated to one of several operations executed on data in a digital processing device. Control words govern execution of the operations as they progress through the pipeline. The pipeline stages, as well as the pipeline entry and exit, are interconnected in a manner that permits each control word to enter and exit the pipeline at any one of the stages, and to skip any stages in which the control word will not govern any operations on data. On occasion, this permits a control word to bypass another control word which originally preceded it in the pipeline, thus to reverse the order of the two control words. A mapping field in each control word predetermines its route through the instruction pipeline, one bit of the map field corresponding to each pipeline stage. The route of each control word further is controlled by arbitration logic to resolve contentions among control words for particular pipeline stages, and to insure against a reversal in control word order when such reversal might produce an error. Each pipeline stage is a data register configured to accommodate one control word at a time. Succeeding stage registers are selectively reduced in length to eliminate selected segments and bit positions, thereby deleting from each control word certain bits and multiple bit fields executed in preceding stages.

17 Claims, 8 Drawing Sheets

VARIABLE STAGE ENTRY/EXIT INSTRUCTION PIPELINE

BACKGROUND OF THE INVENTION

The present invention relates to pipelined hardware for sequentially handling instructions that govern data operations in digital processors, and more particularly to a means for selectively and individually routing instructions through the pipelined hardware.

One known manner of improving data processing speeds in devices for processing digital data, is to configure each computer program instruction as a series of microinstructions presented to a pipeline, and then to perform operations on the microinstructions (or on other data according to the microinstructions) as they progress sequentially through a sequence of pipeline stages in the pipeline. This facilitates concurrent execution of different instructions, one instruction residing in each pipeline stage. An example of a pipelined processor is disclosed in U.S. Pat. No. 4,450,525 (Demuth et al).

While the configuration of microinstructions can vary from one system to another, each microinstruction typically includes a set of multiple bit fields containing control information used by system hardware, including pipelined hardware. Each of the control fields is specifically related to one of the pipeline stages, in that the control field is valid only when the microinstruction resides in the related stage. Particular microinstructions can include one or more control fields relating to one, or all, of the pipeline stages.

The pipeline stages are connected in sequence between a pipeline entry and a pipeline exit. Accordingly, each of the microinstructions progresses sequentially through every pipeline stage, regardless of the number of pipeline stages to which it relates. Consequently, a substantial number of machine cycles are consumed in which microinstructions reside in unrelated pipeline stages, with no operations performed, either on the microinstructions themselves or other data within the processing device.

Therefore, it is an object of the present invention to provide a multiple stage instruction pipeline configured for more effective use of available machine cycles, reducing the number of cycles in which microinstructions reside in unrelated pipeline stages.

Another object is to provide a process for selectively routing microinstructions or control words through a multiple stage instruction pipeline, whereby each microinstruction or control word temporarily resides only in selected stages of the pipeline.

A further object is to provide each of a plurality of microinstructions with a mapping field that identifies the data operations, and therefore the stages, to which the microinstruction relates.

Yet another object of the invention is to provide a means for arbitration among control words or microinstructions competing for access to a particular pipeline stage as they progress through an instruction pipeline.

SUMMARY OF THE INVENTION

To achieve these and other objects, there is provided an apparatus for governing the execution of operations on data in a digital processing device. The apparatus includes a pipeline having a plurality of pipeline stages. Each pipeline stage is dedicated to one of a plurality of data operations executed on data in the processing device. A pipeline input receives digital control words into the pipeline. The digital control words govern the execution of the data operations as they progress through the pipeline. Each of the control words includes control information corresponding to at least a selected one of the data operations, and mapping information that identifies each of the selected data operations. Each control word further governs execution of each selected data operation when residing in the pipeline stage dedicated to that data operation. The apparatus further includes a pipeline exit, and means connecting the pipeline input and exit to each of the pipeline stages, whereby control words can enter and leave the pipeline at any one of the pipeline stages. A control word routing means selectively and individually routes each of the control words through the pipeline depending upon the mapping information of the control word.

Preferably the pipeline stages are connected sequentially, with each control word bypassing stages other than the selected pipeline stages. Stages are selected based upon the mapping information, in the sense that the control word is routed through a pipeline stage only if the word includes control information corresponding to the data operation of that particular stage. Each control word can have a mapping field with a plurality of bit positions, one bit position corresponding to each pipeline stage. A binary "1" in a given bit position indicates that the control word includes control information relating to that pipeline stage. Accordingly, the mapping field identifies all pipeline stages relating to the control word, and provides a road map for routing the control word only through the related stages.

The result is more effective use of available machine cycles in the pipeline. Instructions can enter the pipeline at the first stage in which the instruction is to execute a data operation, rather than at the initial pipeline stage. Similarly, an instruction can exit the pipeline at the final pipeline stage of its execution, rather than at the final stage of the pipeline. An instruction (i.e. a control word) can bypass pipeline stages during its execution. This allows a particular instruction to "leap frog" another instruction initially ahead of it in the pipeline, so long as the intermediate pipeline stages are not used by the particular instruction. A substantial improvement in performance is realized, because more instructions can be executed during the same number of available machine cycles.

The ability of control words to bypass pipeline stages gives rise to potential conflicts among two or more control words attempting to enter one of the pipeline stages. Accordingly, arbitration logic is provided to resolve such contentions. A pipeline configured in accordance with the present invention thus calls for logic circuitry not needed in conventional, sequentially coupled pipeline stages. However, the additional logic can be configured on the processor chip, and is more than justified by the performance gain.

A further aspect of the present invention is a process for routing control words or microinstructions through a multiple stage instruction pipeline. The process includes the following steps:

a. identifying, in connection with each control word, the pipeline stages related to the control word in the sense that the control word is to be executed from related stages; and b. responsive to the identification of the related pipeline stages, selectively routing the control word through the pipeline along a path that includes only the related pipeline stages.

The process can include the further step of modifying each control word as it progresses through the pipeline, by deleting control information relating to each pipeline stage before the control word enters the next subsequent pipeline stage. In the preferred implementation of this process, each of the pipeline stages is a register having latch positions corresponding to a plurality of multiple bit control fields, each control field corresponding to one of the pipeline stages. In this context, the subsequent stage register is configured without the latch positions corresponding to the control fields of previous stages. As a result, information no longer useful is effectively deleted as the control word progresses through the pipeline. Thus, logic (hardware) and physical space requirements are reduced as compared to conventional pipeline stage arrangements, as succeeding registers require fewer latch positions.

Thus in accordance with the present invention, the efficiency of a multiple stage instruction pipeline is substantially enhanced, with microinstructions being selectively routed only to pipeline stages in which they govern operations performed on processor data.

IN THE DRAWINGS

For a further appreciation of the above and other features and advantages, reference is made to the following detailed description and to the drawings, in which.

DETAILED DESCRIPTION OF THE PREFERRED EMBODIMENTS

Figure 1:
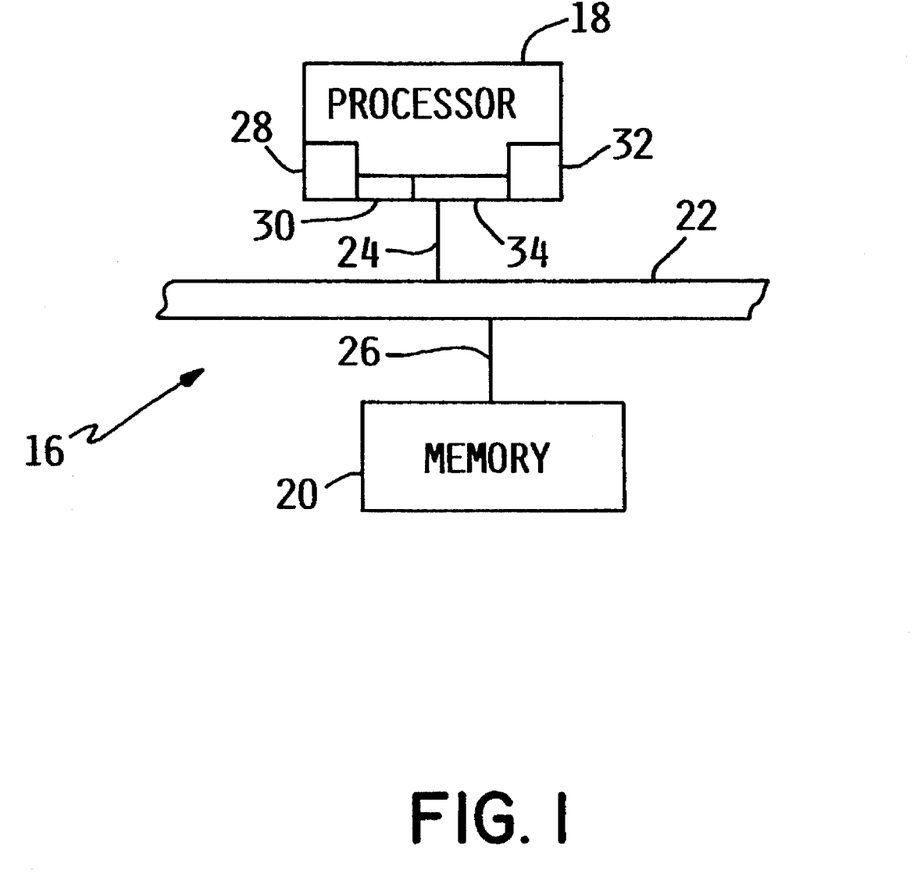
FIG. 1 is a schematic view of an information processing system including a digital processing device, a main storage memory and an interface between the device and memory.

Turning now to the drawings, there is shown in FIG. 1 an information processing network 16 for storing and performing various operations upon bit-encoded data. The network includes a processing device 18, a main storage memory 20 and an interface 22 coupling the processing device and main memory. A data line 24 connects processing device 18 to the interface, while data line 26 connects the interface to main storage memory 20.

Processing device 18 executes assembly level computer program instructions sequentially in performing logical operations on data, for example store, add, and move-character functions. To this end, the processing device employs a horizontal microcode (HMC) for interpreting the assembly level instructions, i.e. decomposing the assembly level instructions into simpler HMC microinstructions or control words that govern the state of the hardware. Processing device 18 includes a control store 28 containing the horizontal microcode (HMC) and a control store output register 30. The processing device further includes arithmetic execution logic 32 for performing operations on data, and an I/O memory interface 34 for transmitting data to and from main storage memory 20.

Figure 2:
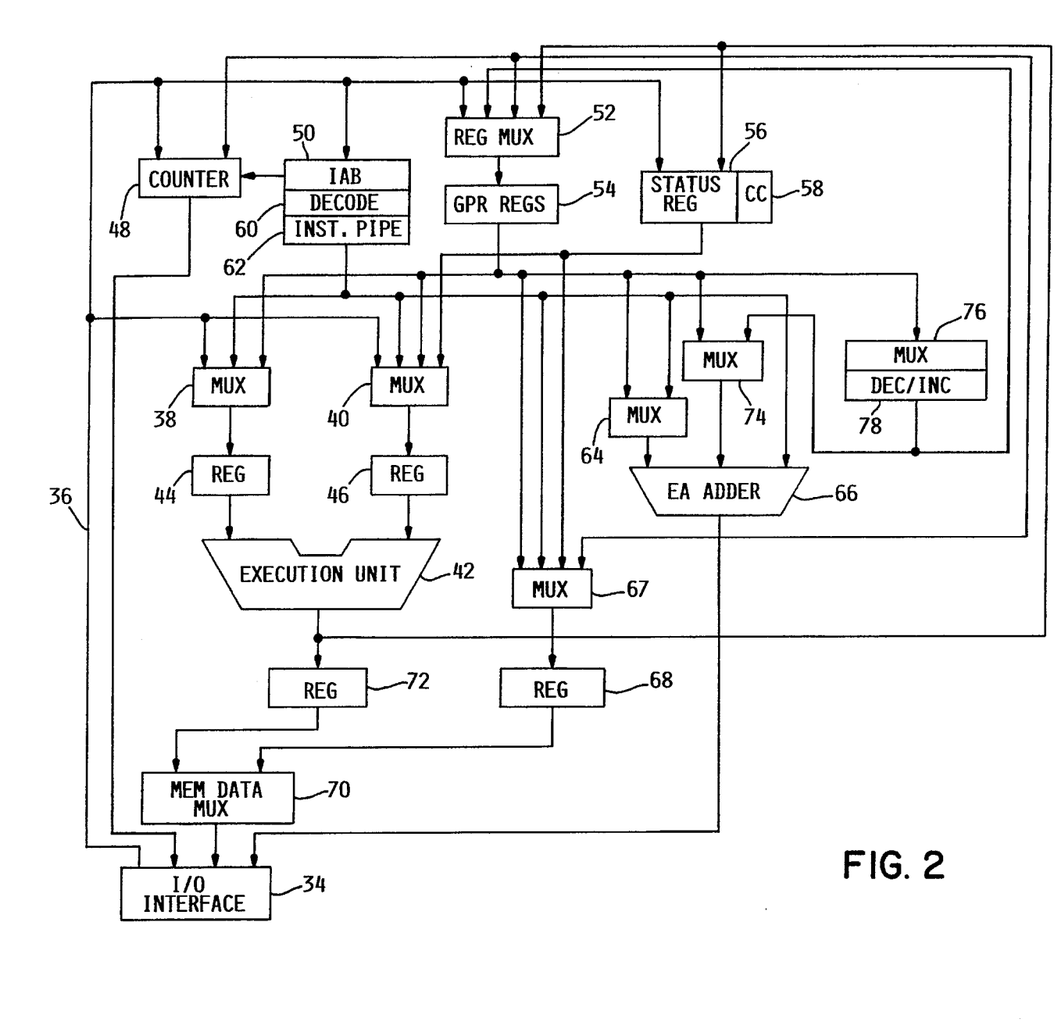
FIG. 2 is a block diagram of certain components of the processing device including an instruction pipeline.

FIG. 2 illustrates hardware components of the arithmetic execution logic, and paths for flow of data among the components. Data from the main memory can be provided to a variety of destinations via interface 34 as indicated at 36, including first and second multiplexers 38 and 40 associated with an arithmetic execution unit 42 through respective registers 44 and 46; a program counter 48; an instruction assembly buffer 50; and a general register multiplexer 52 providing its output to a set of general purpose registers 54. The interface 34 also can provide data to a status register 56 and a condition code register 58.

A decoder 60 receives the output of assembly buffer 50, decomposing the output into control words or microinstructions in horizontal microcode. The control words are provided to an instruction pipeline 62, where they progress sequentially through one or more pipeline stages of the pipeline and govern operations executed upon data in processing device 18.

The output of instruction pipeline 62 can be provided to multiplexer 38, multiplexer 40, a first address multiplexer 64 and an effective address calculating unit 66. Address unit 66 can provide its output to a multiplexer 67 and then to a register 68 that provides its output to a memory data multiplexer 70, to I/O interface 34, to program counter 48, and to multiplexer 52.

The output of execution unit 42 can be provided: to memory data multiplexer 70 from a register 72; to general register multiplexer 52; and to status register 56 and condition code register 58. The output of the general purpose register set 54 is available to multiplexers 38 and 40, address multiplexer 64 and a further address multiplexer 74, and a multiplexer 76 that provides its output to a decrementing/incrementing unit 78. Unit 78 can provide its output to address multiplexer 74 and general register multiplexer 52. Thus, multiple paths are available for transmission of data among the components in FIG. 2. Actual data transmission does not occur indiscriminately along all available paths, but rather is controlled by the microinstructions as is later explained.

Figure 3:
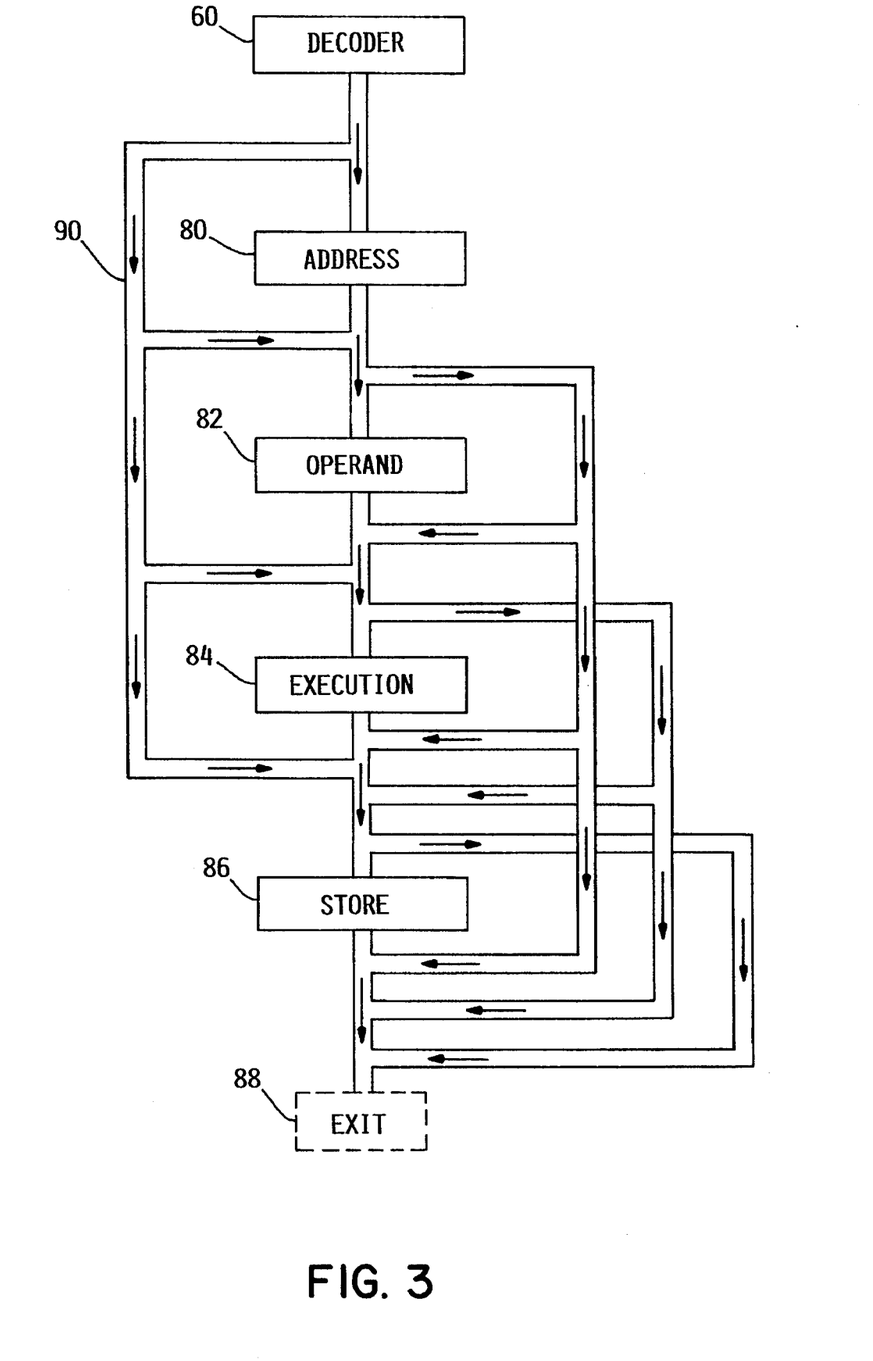
FIG. 3 is a schematic view illustrating flow of data in the instruction pipeline.

In FIG. 3, instruction pipeline 62 is illustrated in greater detail to show the flow of control words through the pipeline. Pipeline 62 includes four stages including an address generation stage 80, an operand loading stage 82, an execution stage 84 and a result storing stage 86. Decoder 60 provides the entry for all control words into the pipeline. All data leaving the pipeline proceeds to one or more of the above-mentioned possible destinations for the instruction pipeline output. A pipeline exit is shown in broken lines at 88. This does not represent an actual hardware component. Rather, exit 88 signifies the point at which the instructions or control words, having served their purpose in performing operations along one or more of the pipeline stages, are no longer needed and leave the pipeline. All control words proceed through pipeline 62 in the same direction (downward as viewed in the figure), but not sequentially in the sense of all microinstructions occupying each stage. Rather, the data pathways interconnecting the stages, indicated generally at 90, provide fifteen distinct routes through pipeline 62, based on the available combinations of one, two, three or all stages.

One feature of the present invention is the interconnection of the pipeline stages, pipeline entry and pipeline exit to provide a variety of routes through the instruction pipeline. In general, for a pipeline composed of n separate stages, the interconnection affords a potential number of routes through the instruction pipeline of $2^n-1$. Control words can enter instruction pipeline 62 at any one of the stages, can exit the pipeline at any stage, and can bypass one or more of the stages as they progress through the instruction pipeline. Information in each control word predetermines the route traversed by the control word through the instruction pipeline, as explained in connection with FIG. 6.

Figure 4:
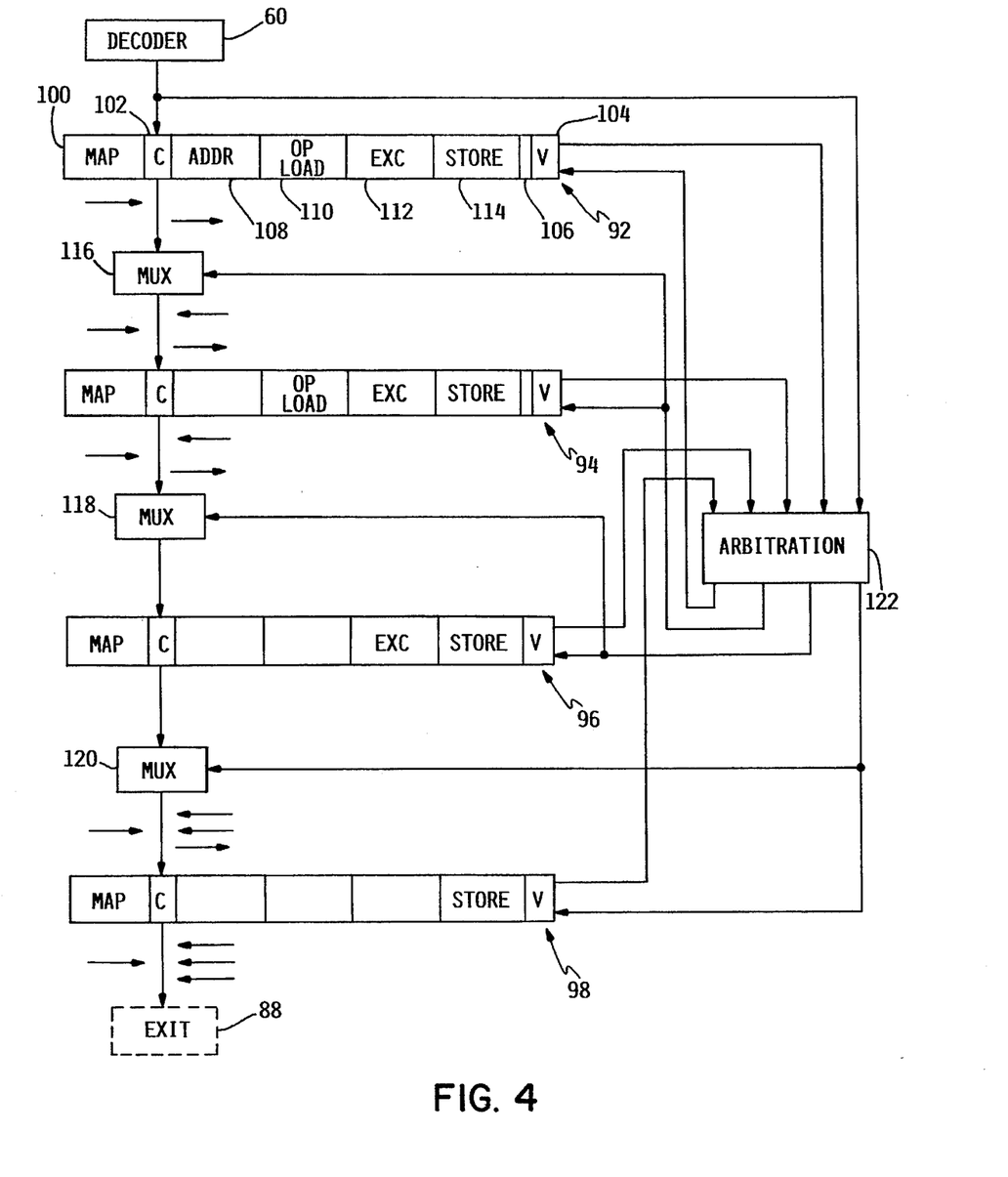
FIG. 4 is a schematic view of the instruction pipeline including arbitration means.

While pathway interconnection 90 affords multiple alternative control word routes, it also creates the need for arbitration among control words contending for access to particular stages. The need is most apparent in connection with result storing stage 86, configured to receive control words from decoder 60 and from any one of preceding pipeline stages 80, 82 and 84. Accordingly, an arbitration scheme is provided as shown in FIG. 4, which also illustrates the pipeline stages and interconnection 90 in greater detail.

Each of the pipeline stages includes a pipeline register, in particular an address generation register 92, an operand loading register 94, an execution register 96 and a result storing register 98. Each register has individual bit positions and multiple bit segments corresponding to individual binary bits or fields of the control words, whereby each control word temporarily and exclusively occupies one or more of the stage registers when progressing through the instruction pipeline. Address generation register 92 includes a map segment 100, a condition-codes affected bit 102, a valid indication bit position 104, an instruction dependent field segment 106, and four control segments 108, 110, 112 and 114. Each of the control segments, like each of the pipeline stages, is dedicated to a specific type of operation performed on data as the control words progress through the instruction pipeline. For example, control segment stores only the field of a control word that specifically relates to address generation. More than one such field may reside in control segment 108 if the particular control word contains more than one address generation field. The remaining control segments of register 92 are similarly limited to one type of field while adapted to accommodate more than one field of that type. Remaining pipeline stage registers 94, 96 and 98 have similar segments and bit positions, but vary as will be explained in connection with FIG. 11.

The interconnection of the pipeline stage registers includes pipeline multiplexers 116, 118 and 120, one of the multiplexers being situated between each pair of adjacent stage registers. Each multiplexer has an input from decoder 60 and from each preceding pipeline stage register, and provides its output to the succeeding stage registers and directly out of instruction pipeline 62, again as represented schematically by "exit" 88. Each multiplexer is selectively switched to provide only one of its inputs to the next subsequent stage. For example, multiplexer 118 selectively couples either decoder 60, register 92, or register 94, to register 96.

Multiplexer switching is controlled by collision detection and arbitration circuit 122 in cooperation with information in each control word. Arbitration circuit 122 receives inputs from decoder 60 and each of the pipeline stage registers. In turn, arbitration circuit 122 generates latch data outputs to the pipeline stage registers. In connection with stage registers 94, 96 and 98, arbitration circuit 122 also provides control signals to the associated multiplexers 116, 118 and 120 that load the pipeline stage registers.

Figure 5:
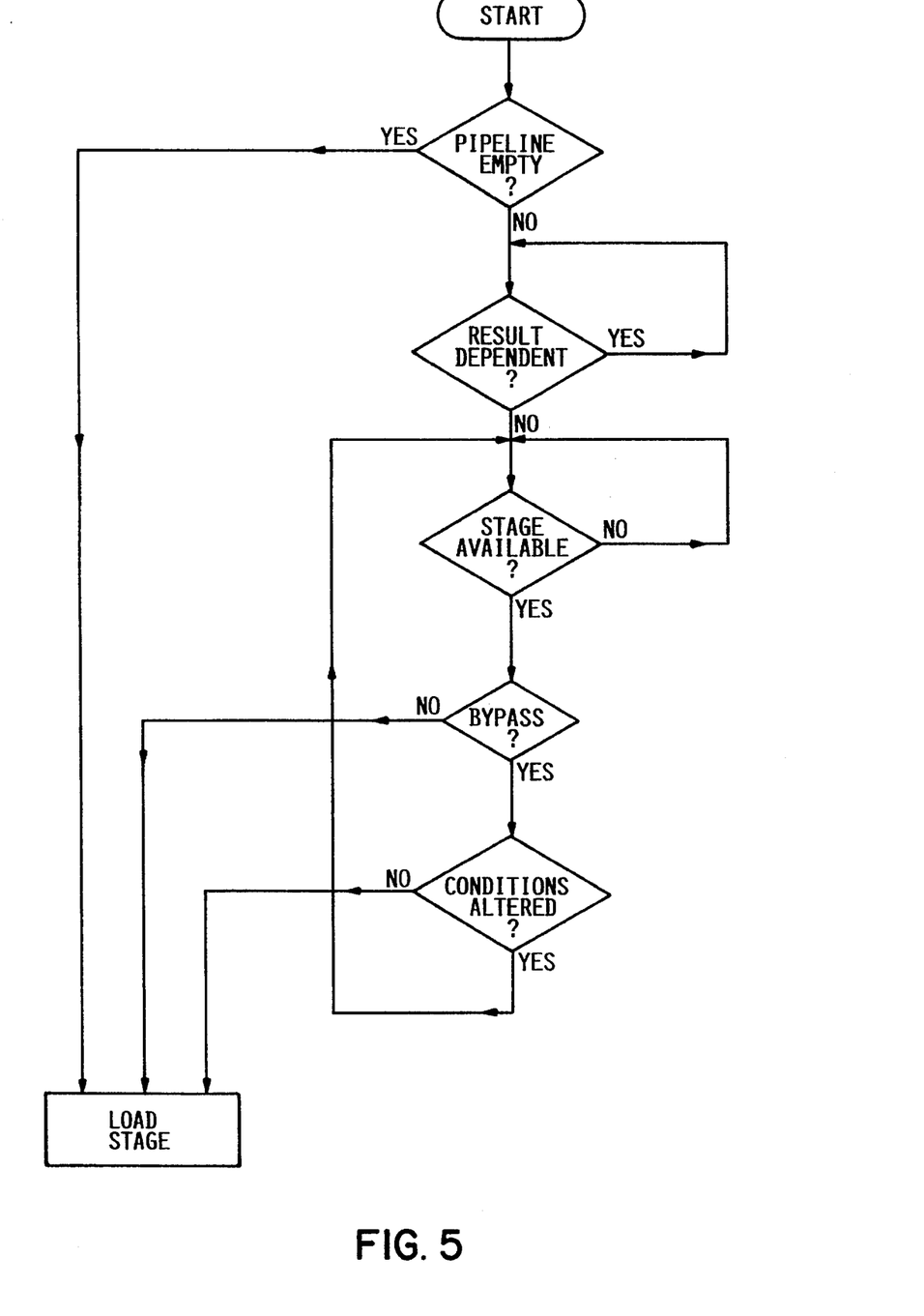
FIG. 5 is a flow chart illustrating operation of the arbitration logic.

Through its connections to the stage registers, multiplexers and decoder 60, arbitration circuit 122 resolves contentions for pipeline stage registers according to the flow chart in FIG. 5.

If instruction pipeline 62 is empty, the control word is immediately provided to the selected pipeline stage register. If not, a determination is made as to the dependency of the control word upon any preceding control word in the pipeline. In other words, there is an inquiry as to whether the incoming control word will be dependent upon the results from any currently executing control words. The inquiry is accomplished by checking each of stage registers 92, 94, 96 and 98 as to whether the register will be altered by the control word currently residing in the register. For example, suppose a control word entering the pipeline at address stage 80 (register 92) is destined to use a particular data register from among general purpose registers to calculate an address. Further, suppose that a preceding instruction at execution stage 84 (register 96) involves storing data to that same particular data register. In this event, the entering control word is not loaded into register 92 until the operation in register 96 is complete.

Upon such completion, or if no dependency is found, the selected register is scanned to determine that it will be available on the next machine cycle, in the sense that no other control word already in the pipeline is scheduled to enter the selected stage register during the next cycle.

Given the indication that the stage is available, it becomes necessary to determine whether the control word, upon entering the destination stage, would bypass or "leap frog" ahead of any preceding control words already executing in the pipeline. If not, the control word is immediately loaded into the appropriate stage register.

However, if the control word would bypass any preceding control words when entering the appropriate stage, a further determination is necessary; namely, whether the control word, upon bypassing any preceding control word, would alter conditions used or to be used by any such preceding control word.

As an example, suppose that a control word is to enter the pipeline at stage 86 (register 98) to store data, e.g. from register 72. Further, suppose that a preceding control word, i.e. one previously entering the pipeline, currently resides in operand stage 82 and will reside in execution stage 84 to perform an operation on data that will alter the contents of register 72. In this event, the later entering control word is not loaded into result storing stage 86 until the preceding control word has completed its operation in execution stage 84. Once the preceding control word has completed its operation, the later entering control word is loaded into the result storing stage.

Further logic resolves contentions to avoid collisions, e.g. among control words competing for access to pipeline stage register 98 from the decoder and from the preceding pipeline stage registers. More particularly, a control word from stage register 96 is favored with respect to the other inputs to multiplexer 120, followed by the output of stage register 94, the output of stage register 92 and the output of decoder 60.

Figure 6:
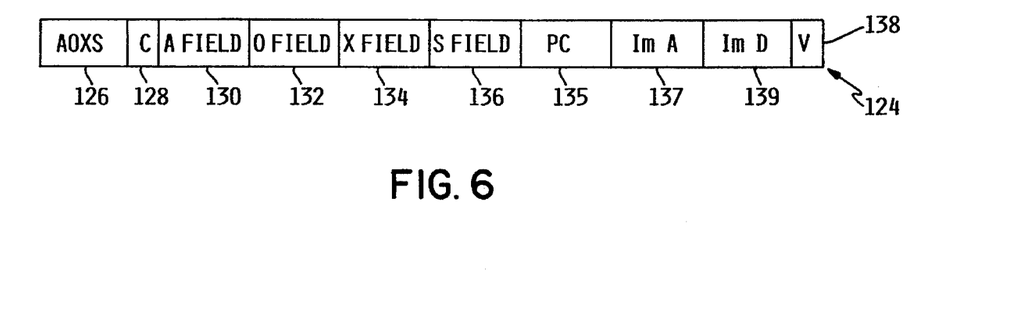
FIG. 6 illustrates the format of a digital microinstruction used in the pipeline.

A control word 124 is shown in FIG. 6, and includes binary bits and fields of bits corresponding to the bit positions and segments in the pipeline stage registers. A map field 126 of the control word includes four bit positions labeled A, O, X and S, respectively. A condition code bit 128 is provided between map field 126 and a plurality of control fields. For convenience, a single control field is shown in connection with each of the pipeline stage registers, including an address generation control field 130, an operand loading control field an execution control field 134 and a result storing control field 136. Program counter, immediate address and immediate data fields are shown at 135, 137 and 139, respectively. Finally, the control word includes a stage valid bit 138.

Map field 126 is related to the control fields, in that it indicates which types of control fields are present in the control word. For example, a binary "1" at bit position "A" in the map field indicates that control word 124 includes at least one address generation control field. Accordingly, control word 124 is destined to govern an address calculating operation on data as it progresses through the instruction pipeline. As another example, a binary "0" in the "X" bit position of map field 126 indicates that control word 124 has no execution control fields. Control word 124 is destined to proceed through the instruction pipeline without governing any execution functions on data. Thus, control word 124 does not enter execution stage 84.

The map field of each control word routes the control word, by predetermining the pipeline stages that the control word will occupy as it progresses through pipeline 62. A value of "1111" routes the control word sequentially through all four pipeline stages, while a value of "1001" routes the control word only through address generation stage 80 and result storing stage 86.

While certain functions performed on data require all four types of operations, numerous functions do not. In connection with these latter functions, the selective routing of the control word only through stages that "use" the control word substantially enhances instruction pipeline efficiency. Instructions can be channeled through the instruction pipeline with fewer machine cycles, and the machine cycles saved become available to accept further control words. The selective routing involves a hardware response to the map field bits, and thus adds virtually nothing to measurable processing time.

FIGS. 7–10 illustrate portions of control word 124 in greater detail, and facilitate an understanding of how these portions relate to the hardware illustrated in FIG. 2. Address generating control field 130 includes two multiplexer subfields 140 and 142 respectively concerning address multiplexers 64 and 74. More particularly, the content of subfield 140 determines the source of data from among the potential sources shown in FIG. 2, and provides for a further alternative of forcing binary zeros into multiplexer 64. Five bit positions in subfield 140 provide up to thirty-two alternative sources of data provided to this multiplexer. For example, "00000" forces all zeros into the multiplexer, while "11000" selects one of the registers in general register set 54, whereby the address value from the selected register is provided to multiplexer 64. In a similar manner, the value in subfield 142 determines the source of data provided to multiplexer 74.

Figure 7:
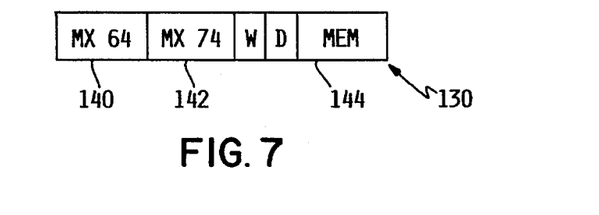
FIGS. 7–10 illustrate segments of the microinstruction in greater detail.
Figure 8:
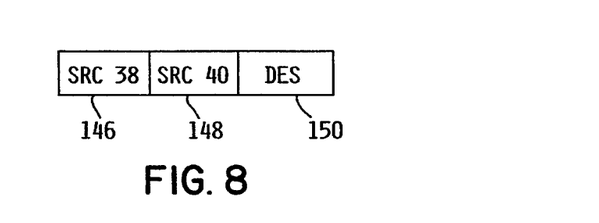

The subfields "W" and "D" respectively determine the length (number of bits) of the data word provided to multiplexer 74, and whether or not the contents of immediate address field of the control word are to be added to the multiplexer inputs.

Finally, the value contained in a memory destination subfield 144 controls multiplexer 67. Typically the output of effective address unit 66 is a calculated memory address, to designate the destination of data to memory from stage 86. This output also determines the memory address from which data is provided to line 36 via interface 34. Further, however, the output of effective address calculating unit 66 can be provided to other destinations, e.g. to load program counter 48, to one of general purpose registers 54 through multiplexer 52, or to the multiplexer 67 for storing data identified by the address to memory via memory interface 34.

The operand loading field (FIG. 8) includes a subfield that determines the source of data provided to multiplexer a subfield 148 that determines the source of data for multiplexer 40, and a subfield 150 for determining the destination of data from main memory 20 to path 36 via I/O memory interface 34. As for destinations, the destination of data from multiplexer 38 is register 44, and data from multiplexer 40 always is provided to register 46. Based on the value in subfield 150, data from memory can be provided (alternatively) to status register 56, condition code register 58, or to one of the general purpose registers 54 via multiplexer 52.

Figure 9:
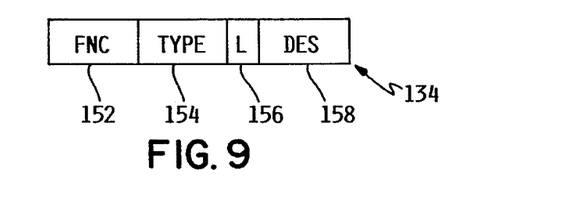

Execution unit 42 receives input operands from registers and 46. Accordingly, no source determining subfield is necessary for the execution control field. A function subfield determines the one of several available functions which execution unit 42 is to perform on the operands provided by registers 44 and 46, and includes five binary bits for selecting a function, e.g. adding the operands, subtracting one from the other, performing logic functions such as "AND" "OR" or "Exclusive OR", and shifting register contents by predetermined amounts, as well as outputting all zeros. A data type subfield 154 and length subfield 156 respectively determine whether data is logical, arithmetic or binary coded decimal, and whether the operation is on a single bit, a single word of two bytes or a double word of four bytes. The binary value in a destination field 158 determines where the execution unit output is sent. Among possible destinations are one of the general purpose registers, the status register, the condition code register and register 72, the holding latch to main storage memory 20.

Figure 10:
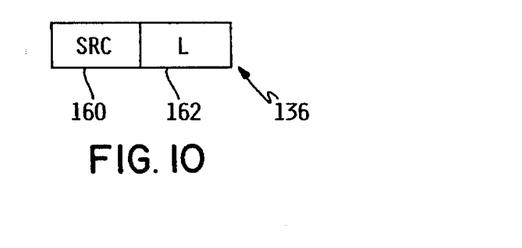

Storage control field 136 includes a source subfield 160 that determines the source of stored data, e.g. either register 68, register 72 or a forced storage of all zeros. A length subfield 162 determines the length of stored data (single byte verses two-byte or four-byte word).

Each of the control fields is valid in, and only in, its respective one of the pipeline stages. Address generation control field 130, for example, governs the calculation of an effective address while the control word resides in address generation register 92. Control field 130, however, serves no useful purpose in any of the subsequent pipeline stage registers, although the control word may contain other types of control fields and temporarily reside in subsequent stage registers.

Figure 11:
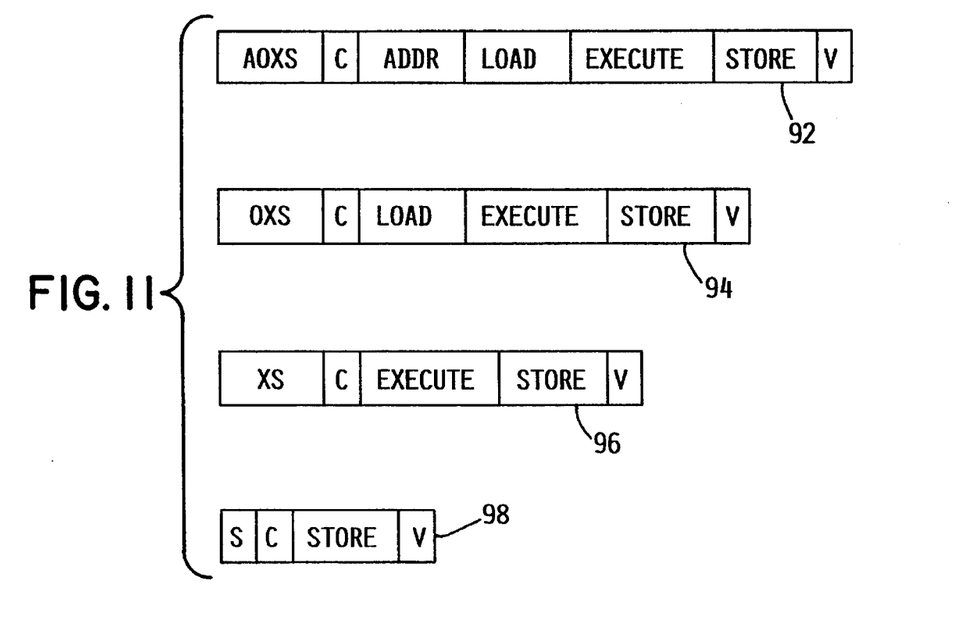
FIG. 11 is a schematic view of pipeline stage registers.

Accordingly, each succeeding stage register is configured to provide no bit positions for stage-specific information used in preceding stages of the pipeline. As seen in FIG. 11, the stage-specific information includes not only the control fields, but also the map field, where each bit position is deleted after its related pipeline stage. Thus, selected bit positions and register segments are removed from succeeding stage registers, to delete from each control word certain data no longer useful in governing data operations as the control word progresses through the pipeline.

Figure 12:
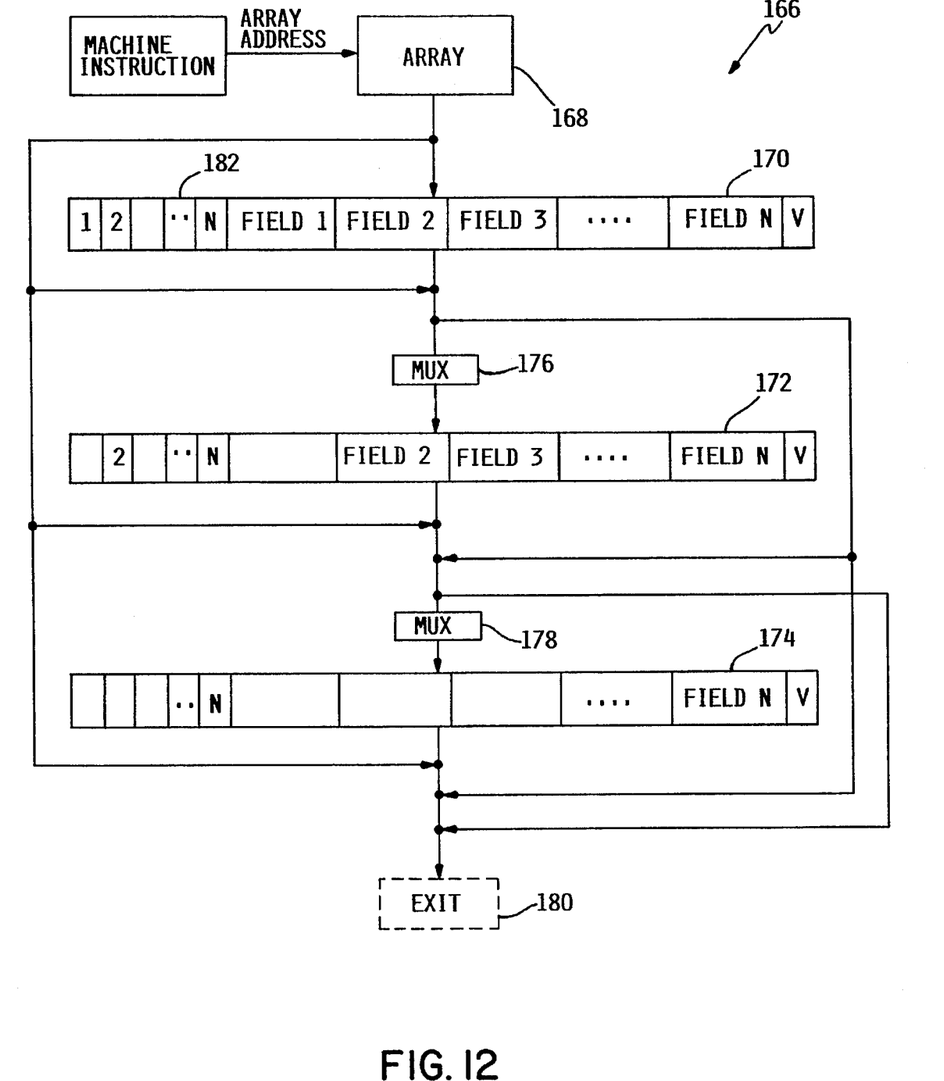
FIG. 12 is a schematic view of an alternative instruction pipeline, with an array in lieu of a decoder at the pipeline input.

FIG. 12 illustrates an alternative configuration instruction pipeline 166 in which assembly level instructions address a control store array 168. The control store array provides the pipeline input in lieu of decoder 60. The pipeline includes multiple stages, three of which are shown at 170, 172 and 174 which represents the "Nth" stage. Multiplexers 176 and interconnect the stages, with a pipeline "exit" 180 indicated in broken lines. As compared to using decoder 60, use of an array such as 168 reduces processing speeds, but affords greater flexibility in terms of compatibility with a wider range of computer architectures.

Stage 170 includes a map segment 182 with bit positions 1–N, control fields 1–N and a stage valid bit position V. Subsequent stages exemplify the information deletion feature of the invention, in particular final stage 174 having a single bit map segment N and a single control field labeled "FIELD N" along with the stage valid bit position. Each rightward pointing arrow represents an input to its associated multiplexer from array 168. The leftward pointing arrows represent inputs to the multiplexer from preceding stages. Every combination of one or more pipeline stages is available in connection with routing each control word through the pipeline.

Thus, in accordance with the present invention a multiple stage instruction pipeline is, configured for efficient use of available machine cycles, in reducing the cycles required for certain microinstructions to reside in the pipeline. Microinstructions are selectively routed through the pipeline, each microinstruction residing only in selected pipeline stages, based upon the data operation control fields in the microinstruction. A mapping field in each microinstruction facilitates identifying the data operations to be executed as each microinstruction progresses through the instruction pipeline. Finally, arbitration logic is provided to avoid collisions among microinstructions contending for access to one of the pipeline stages, and further to insure that a control word can skip ahead of another control word formerly preceding it, but only under conditions of nondependency and where the reversal of order can not cause error.

What is claimed is:

1. An apparatus for governing the execution of operations upon data in a digital processing device, said apparatus including:

a pipeline including a plurality of interconnected stages, each stage being dedicated to one of a plurality of data operations executed on data in a digital processing device;

a pipeline input for receiving a plurality of digital control words into the pipeline for governing the execution of the data operations as the digital control words progress through the pipeline;

each one of the digital control words including control information dedicated to at least one selected operation of the data operations and further including mapping information indicating each selected data operation to which the control information, of said one of the control words, is dedicated;

each one of the digital control words further governing the performance of the selected data operation when said one of the control words resides in a particular one of the pipeline stages dedicated to the selected data operation;

means coupling the pipeline input and a pipeline exit to each one of the pipeline stages to enable one each of the control words to occupy only selected ones of the pipeline stages as said one of the control word progresses through the pipeline; and a control word routing means for selectively and individually routing said one of the control words through the pipeline via only selected pipeline stages, the selected pipeline stages for said one of the control words depending upon the mapping information of said one of the control words.

2. The apparatus of claim 1 wherein:

the selected pipeline stages for said one of the control words are the stages dedicated to the data operations identified in the mapping information said one of the control words.

3. The apparatus of claim 2 further including:

means for connecting the pipeline stages to one another in a predetermined sequence and further for allowing the control words to enter the instruction pipeline either at any one of the stages and to exit the instruction pipeline either at said one of the stages or at any of the stages following said one stage in the predetermined sequence, whereby each of the digital control words progresses through the pipeline while bypassing pipeline stages other than said selected pipeline stages.

4. The apparatus of claim 3 further including:

a plurality of multiplexers coupled between successive ones of the pipeline stages, each of the multiplexers having inputs coupled to all preceding pipeline stages in the predetermined sequence of pipeline stages.

5. The apparatus of claim 4 wherein:

each of the multiplexers selectively inhibits control fields valid in a preceding pipeline stage from occupying a next subsequent pipeline stage, thereby to selectively delete control fields of each one of the control words as said one of the control words progresses through the pipeline.

6. The apparatus of claim 1 wherein:

the control information of each control word resides in at least one of a plurality of multibit fields, each of the multibit fields being valid in only one of the pipeline stages.

7. The apparatus of claim 1 wherein:

the mapping information of each one of the digital control words resides in a mapping field of said one of the control words, said mapping field including one bit position representing each of the pipeline stages.

8. The apparatus of claim 1 further including:

an arbitration means for resolving conflicts among control words attempting to enter one of the pipeline stages.

9. The apparatus of claim 1 wherein:

each of the pipeline stages is a register.

10. The apparatus of claim 1 wherein:

each control word further includes a stage valid field.

11. The apparatus of claim 1 wherein:

the digital processing device includes a condition code register, and each of the control words further includes a condition code bit position for indicating whether said one of the control words will alter the condition code register as said one of the control words progresses through the pipeline.

12. In a data processing device including a pipeline having a plurality of pipeline stages, each pipeline stage dedicated to one of a plurality of data operations executed on data in the processing device, wherein the data operations are governed by a plurality of digital control words as the control words progress through the pipeline, a process for executing the data operations, including the steps of:

making a determination, for each one of the digital control words, of selected ones of the data operations for which said one of the control words includes control information; and wherein the determination step includes providing a map field in each one of the digital control words, each map field including mapping information that identifies each of the data operations for which said one of the control words includes control information; and responsive to the determination, selectively routing said one of the digital control words through the pipeline in an individual sequence of the pipeline stages, whereby said one of the digital control words, as it progresses through the pipeline, occupies only the pipeline stages dedicated to the selected data operations.

13. The process of claim 12 including the further step of:

resolving conflicts among digital control words concurrently attempting to enter any one of the pipeline stages.

14. The process of claim 13 wherein:

the step of resolving conflicts includes providing a valid bit identification in each digital control word that is set whenever a valid control word resides in one of the pipeline stages, and preventing any other digital control word from entering a given pipeline stage when a valid bit is set in the given pipeline stage.

15. The process of claim 12 including the further step of:

providing a condition code bit in each one of the control words indicating, if set, that said one of the control words will change a condition code register of the data processing device as said one of the control words progresses through the pipeline.

16. The process of claim 12 including the further step of:

making a determination, for each digital control word, as to whether the digital control word depends upon a result of a preceding control word currently executing in the pipeline and, if so, delaying the routing of the digital control word until the preceding control word has completed said execution.

17. The process of claim 12 including the further steps of:

determining, for each one of the digital control words, whether said step of selectively routing of said one of the digital control words will cause said one of the digital control words to bypass a currently executing control word already in the pipeline;

if so, determining whether said one of the digital control words, if it bypasses the currently executing control word, would alter a condition of the currently executing control word; and if so, delaying said routing of said one of the digital control words until the currently executing control word completes said execution, thereby either to delay or prevent said bypass.

* * * * *